United States Patent
Maitra et al.

(10) Patent No.: US 12,314,015 B2
(45) Date of Patent: May 27, 2025

(54) REDUNDANT MACHINE LEARNING ARCHITECTURE FOR HIGH-RISK ENVIRONMENTS

(71) Applicant: MICROSOFT TECHNOLOGY LICENSING, LLC, Redmond, WA (US)

(72) Inventors: Kingsuk Maitra, Fremont, CA (US); Kinshumann Kinshumann, Redmond, WA (US); Garrett Patrick Prendiville, Sallins (IE); Kence Anderson, Berkeley, CA (US)

( * ) Notice: Subject to any disclaimer, the term of this patent is extended or adjusted under 35 U.S.C. 154(b) by 406 days.

(21) Appl. No.: 17/845,959

(22) Filed: Jun. 21, 2022

(65) Prior Publication Data
US 2023/0341822 A1    Oct. 26, 2023

Related U.S. Application Data

(60) Provisional application No. 63/333,553, filed on Apr. 21, 2022.

(51) Int. Cl.
G05B 13/02    (2006.01)

(52) U.S. Cl.
CPC ............... G05B 13/0265 (2013.01)

(58) Field of Classification Search
CPC .................................................. G05B 13/0265
See application file for complete search history.

(56) References Cited

U.S. PATENT DOCUMENTS

| | | | |
|---|---|---|---|
| 11,816,600 B1 * | 11/2023 | Cope ..................... | G08B 19/00 |
| 2020/0019455 A1 | 1/2020 | Wolfson et al. | |
| 2020/0117532 A1 | 4/2020 | Wolfson et al. | |
| 2022/0027257 A1 | 1/2022 | Harutyunyan et al. | |
| 2022/0113049 A1 | 4/2022 | Maitra et al. | |
| 2022/0382620 A1 * | 12/2022 | Bramble ............. | G06F 11/0787 |
| 2023/0123527 A1 * | 4/2023 | Michael ............. | G05B 23/0221 702/183 |
| 2023/0195061 A1 * | 6/2023 | Gadre ................. | G05B 19/188 700/159 |
| 2023/0376026 A1 * | 11/2023 | Zhang ................. | G06N 3/0455 |

OTHER PUBLICATIONS

"International Search Report and Written Opinion Issued in PCT Application No. PCT/US2023/012369", Mailed Date: Jun. 1, 2023, 11 Pages.

* cited by examiner

*Primary Examiner* — Nathan L Laughlin
(74) *Attorney, Agent, or Firm* — Newport IP, LLC; Jacob P. Rohwer

(57) ABSTRACT

The techniques disclosed herein enable systems to enhance the resilience of autonomous control systems through a fault-tolerant machine learning architecture. To achieve this, a fault-tolerant machine learning agent is constructed with a selector agent, a nominal agent, and a redundancy agent which is a multidimensional lookup table. The fault-tolerant machine learning agent extracts state data from an environment containing a control system and various components. The nominal agent and the redundancy agent generate actions for application to the control system based on the state data which are provided to the selector agent. Based on an analysis of the state data, the selector agent can detect a failure condition. In the event of a failure condition, the selector agent deploys the action generated by the redundancy agent lookup table to resolve the failure condition and restore normal operations.

20 Claims, 7 Drawing Sheets

REDUNDANT MACHINE LEARNING ARCHITECTURE FOR HIGH-RISK ENVIRONMENTS

PRIORITY APPLICATION

The present application is a non-provisional application of, and claims priority to, U.S. Patent Application No. 63/333,553 filed on Apr. 21, 2022, entitled: REDUNDANT MACHINE LEARNING ARCHITECTURE FOR HIGH-RISK ENVIRONMENTS, the subject matter of which is hereby incorporated by reference in its entirety.

BACKGROUND

As the scale and complexity of control systems has increased, various organizations have sought improvements in the field of autonomous platforms and autonomous control systems. In many examples, autonomous control systems relate to the control of machinery that is involved in a process such as chemical processing, semiconductor fabrication, and indoor climate control. Autonomous control systems can also be applied to the context of computing platforms such as a datacenter that provides cloud computing services. Thanks to advances in autonomous control systems, many such processes in manufacturing, computing, and other disciplines can realize benefits in product throughput, efficiency, and other aspects. This is largely the result of reduced reliance on human oversight which can be inconsistent and prone to mistakes.

In recent times, many control systems have been further enhanced with advanced computing techniques such as machine learning and artificial intelligence. These approaches enable systems to not only maintain consistent throughput but even improve over time. In a specific example, an autonomous control system can be augmented by reinforcement learning, commonly referred to as an RL brain or an RL agent. The reinforcement learning agent can accordingly be configured with an objective or goal which is typically to optimize some aspect of the process. For instance, an operator of a datacenter can configure the reinforcement learning agent to minimize an error rate of the datacenter. The reinforcement learning agent can accordingly modify various aspects of the datacenter such as the number of active cores or ambient temperature of the cooling system. In doing so, the reinforcement learning model can iteratively learn a realistically optimal configuration of the datacenter to achieve the specified goal (e.g., minimize errors). In contrast to an autonomous control system, these systems can be referred to as autonomous platforms as the system can be enabled to independently make decisions and adjust operations in real time.

However, while operators may realize significant improvements in efficiency or throughput through advanced computing techniques, many existing machine learning solutions for autonomous control systems can fail to account for some critical factors. For example, many machine learning agents can have a propensity to accumulate errors over long periods of operation. As such, these machine learning agents must undergo regular maintenance often referred to as retraining. However, due to the dynamic and oftentimes unpredictable nature of machine learning agents, errors can accumulate in unexpected ways which can lead to operational failures that retraining protocols may be unable to prevent. In various examples, an operational failure may result in system downtime (e.g., minutes or hours) as nominal operations are restored. However, in highly sensitive operations such as datacenter, even a few minutes of downtime can result in severe damage to reputation and massive loss of revenue for the operator of the datacenter. Furthermore, many customer applications can rely upon the computing infrastructure provided by the datacenter for their own business operations. As a result of the downtime, the customer applications can also suffer damaged reputations and loss of revenue.

While machine learning agents can oftentimes be trained and validated prior to deployment in a live context, there is typically no mechanism for detecting and correcting failure conditions that may lead to operational failures and downtime. For example, a machine learning agent may be trained to control a cooling system for a datacenter using historical state and action data. However, the machine learning agent may lack the ability to adapt to unexpected conditions which may not be captured by the historical data. Thus, there is a need for methods to increase redundancy in autonomous control systems to minimize and mitigate operational failures.

It is with respect to these and other considerations that the disclosure made herein is presented.

SUMMARY

The techniques disclosed herein improve the functionality of control system through the introduction of a fault-tolerant architecture for machine learning agents. Generally described, a control system in the context of the present disclosure can comprise one or more physical components that are controlled by a machine learning agent. In a specific example, a control system can operate a cooling system for a datacenter that includes fans, radiators, water pumps, and other components. Accordingly, a machine learning agent can be configured to oversee and manage the control system. To increase resilience against errors, the machine learning agent can include mechanisms for detecting and addressing failure conditions to prevent and mitigate operational failures. Namely, the disclosed system can utilize a selector agent in combination with a nominal agent and a redundancy agent, to dynamically adapt to changing conditions.

In various examples, data defining a current state of an environment can be extracted by a fault-tolerant machine learning agent. For instance, the state data can define operating conditions of various components such as temperature, operational loads, and so forth. In a specific example, the state data can relate to a cooling system for a datacenter. Accordingly, the state can define fan speeds, water pump states, current aisle temperatures, and the like. While state data can capture information for a specific portion of the environment (e.g., the cooling system of a datacenter), the state can alternatively capture all aspects of the environment (e.g., the whole datacenter).

The state data can subsequently be provided to constituent agents of the fault-tolerant machine learning agent. In one example, a nominal agent can analyze the state data and determine an action for application to the control system assuming nominal operation conditions. For instance, the nominal agent may determine that a datacenter is likely to experience elevated computing loads over a certain time period. Accordingly, the nominal agent may generate an action that directs a control system to increase the cooling capacity of the datacenter through increased fan speeds and water pump pressure.

The state data can additionally be provided to a redundancy agent to enable the redundancy agent to generate a backup action. In various examples, the redundancy agent and the backup action can be utilized by the system to resolve failure conditions in a well-defined manner. As will be discussed below, the redundancy agent can be a multi-dimensional lookup table that is generated by several machine learning agents and indexed by the various conditions defined by the state data. By utilizing a predetermined lookup table, the disclosed system can rapidly respond to emergencies without incurring the high computing costs typically associated with a machine learning agent. In this way, the system can quickly resolve failure conditions to prevent operational failures and downtime.

Subsequently, the actions generated by the nominal agent and the redundancy agent can be provided to a selector agent. The selector agent can be a machine learning agent that analyzes the state data to detect failure conditions. Based on the analysis, the selector agent can select the action generated by the nominal agent or the redundancy agent for execution by the control system. For instance, if the selector agent determines from the state data that the components operated by the control system are functioning normally, the select agent can select the action generated by the nominal agent. Conversely, if the selector agent detects a failure condition from the state data, the selector agent can select the action generated by the redundancy agent to resolve the failure condition and prevent an operational failure.

As selected actions are applied to the control system for execution, the fault-tolerant machine learning agent can continue to extract state data from the environment. In this way, the disclosed system can monitor the effectiveness of selected actions and adjust the fault-tolerant machine learning agent accordingly. For instance, the selector agent may detect from the state data that the operating conditions of a component satisfy a failure condition. In response, the selector agent can apply the action generated by the redundancy agent to guide the control system and component away from the failure condition. By continually extracting state data, the selector agent can determine that the failure condition has been resolved at which point, the selector agent can apply the actions determined by the nominal agent to restore regular operations.

In one technical benefit of the present disclosure, the redundancy agent provides resilience to operational failures that existing solutions typically lack. Consequently, a typical system may fail or exhibit undesired behavior in response to unexpected changes to operating conditions thus requiring downtime to manually address. Such outcomes are undesirable in any situation but represent a totally unacceptable risk when deploying autonomous control systems to enhance sensitive applications such as a datacenter. In contrast, the disclosed system introduces redundancy mechanisms for machine learning agents for gracefully resolving failure conditions to prevent operational failures and downtime.

In another technical benefit of the present disclosure, the fault-tolerant machine learning agent can improve efficiency of control systems through the redundancy agent and user-defined failure conditions. This is due to the granularity provided by user-defined failure conditions that enable control systems to maintain optimal operating conditions for various components. In one example, while a component may operate under an acceptable temperature range, optimal conditions may be different from the acceptable temperature range. Accordingly, an administrative entity such as a system engineer can configured the failure conditions such that the fault-tolerant machine learning agent maintains the optimal temperature range for the components.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques described herein provide systems for enhancing autonomous control platforms through the introduction of a fault-tolerant architecture for machine learning agents. As mentioned above, the machine learning agent can comprise a selector agent, a nominal agent, and a redundancy agent to cooperatively generate and select actions for execution by a control system. It should be understood that an autonomous platform as discussed herein differs from an automated control system in that an autonomous platform can be enabled to make decisions based on information extracted from the environment.

The disclosed system addresses several technical challenges associated with autonomous platforms and improving fault tolerance for machine learning agents. For example, many existing approaches for applying machine learning to autonomous systems lack mechanisms for fault tolerance and correction. As such, many typical systems fail or exhibit unexpected behavior in response to changing conditions within the environment. In highly sensitive applications, such as a datacenter, such an outcome is completely unacceptable and can result in extended downtime leading to massive loss in revenue and damage to reputation. By integrating redundancy and fault-tolerance into the machine learning agent, the disclosed system can gracefully recover from failure conditions and prevent catastrophic operational failures.

Furthermore, the redundancy agent can be configured as a multidimensional (e.g., two-dimensional) lookup table that defines predetermined actions for various operating conditions. As will be discussed below, by constructing the redundancy agent in this way, the disclosed system can avoid the high computational cost associated with generating actions in real time using machine learning agents. This is critical for time sensitive situations such as resolving failure conditions as any delay can lead to high severity failures and thus downtime.

Various examples, scenarios, and aspects that enable quality aware machine learning in autonomous platforms, are described below with reference to FIGS. 1-6.

Figure 1:
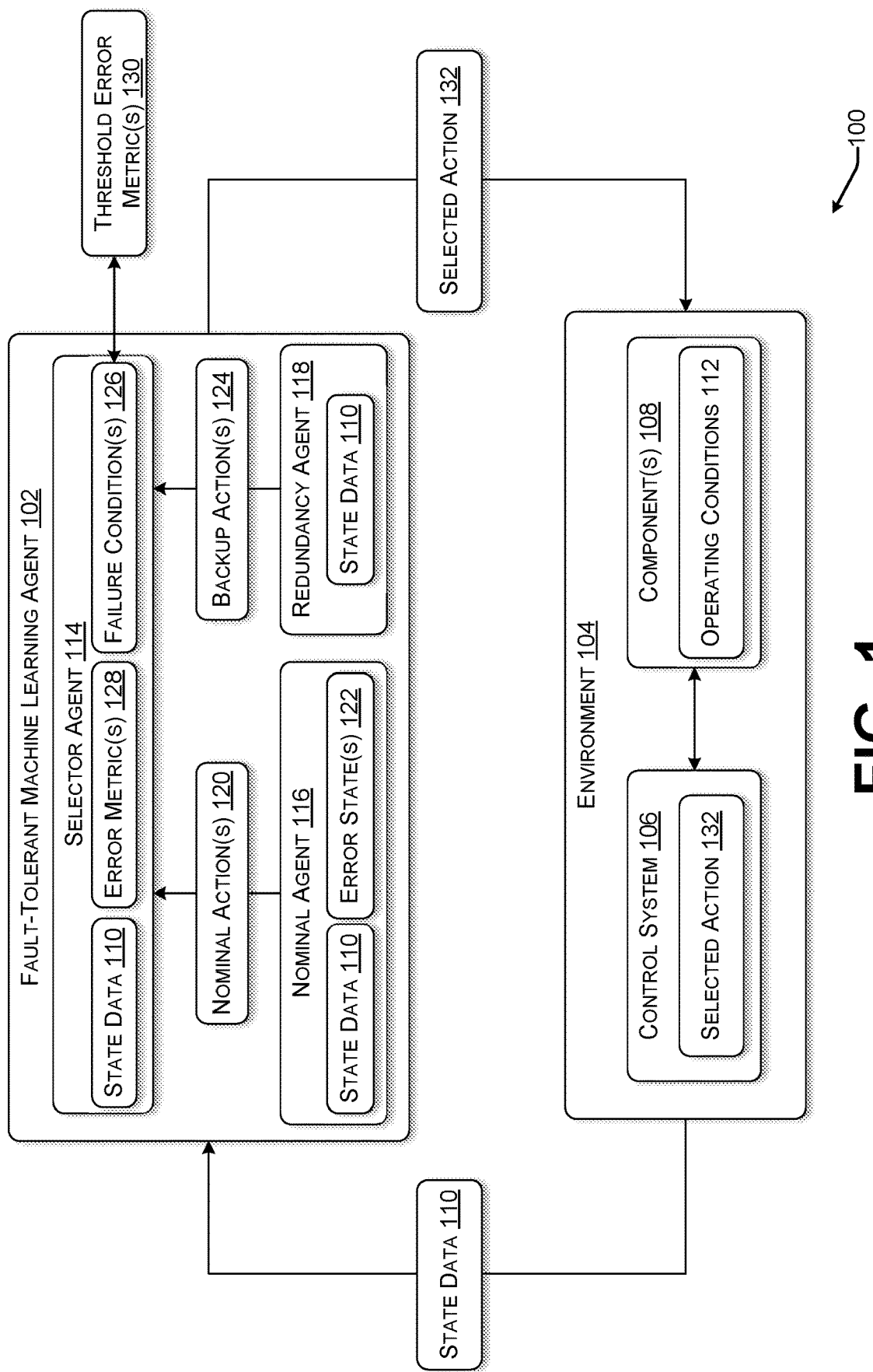
FIG. 1 is a block diagram of a system for managing an environment using a fault-tolerant machine learning agent.

FIG. 1 illustrates an example system 100 in which a fault-tolerant machine learning agent 102 manages an environment 104 containing a control system 106 for operating various components 108. In various examples, the environment 104 can be a domain in which the fault-tolerant machine learning agent 102 is deployed and utilized to control some or all of the components 108 within the environment 104. For instance, the environment 104 can be a datacenter where various systems can be managed by fault-tolerant machine learning agents 102. In one example, a fault-tolerant machine learning agent 102 can be utilized to control the cooling system of the datacenter while other fault-tolerant machine learning agents 102 control other systems such as the internal network, storage systems, and so forth. Alternatively, a single fault-tolerant machine learning agent 102 can be configured to oversee and manage all the systems of the datacenter environment 104. In other examples, the environment 104 can be a manufacturing plant, an office building, or any other suitable setting for an autonomous platform.

To initialize operations, the fault-tolerant machine learning agent 102 can extract state data 110 from the environment. The state data 110 can capture and quantify various characteristics of the environment 104 such as operating conditions 112 of components 108 within the environment 104. Consider again a scenario in which a fault-tolerant machine learning agent 102 controls a cooling system for a datacenter. In this example scenario, the state data 110 can capture the fan speed of radiators, pressure for water pumps, aisle temperatures within the datacenter, outside air temperature, and the like. It should be understood that the components 108 can be any piece of equipment that the fault-tolerant machine learning model manages 102 via the control system 106 and that the state data 110 can include any information pertaining to the components 108.

Based on the state data, the fault-tolerant machine learning agent 102 can determine various actions for application to the environment 102 to manage the control system 106. In various examples, the state data 110 can be provided to a selector agent 114, a nominal agent 116, and a redundancy agent 118 to inform the decision-making strategies the fault-tolerant machine learning agent 102. The nominal agent 114 can analyze the state data 110 and extract several constituent states. For instance, in a cooling system, one state may relate to fan speed while another state relates to water pump pressure. For each state, the nominal agent can define relevant nominal actions 120 that can be applied to the control system 106 to modify an operating condition 112 associated with the state. For example, while a state can relate to fan speed, a corresponding nominal action 120 can change the fan speed. Furthermore, the nominal agent 116 can define a set of corresponding error states 122 for the state data 110. In this way, the nominal agent 114 can quantify an error level associated with each of the constituent states.

Similarly, the redundancy agent 118 can utilize the state data 110 to generate a corresponding backup action 124. In various examples, the backup action 124 can be selected by the selector agent 114 to resolve failure conditions at the environment 104. Stated another way, the redundancy agent 118 and backup actions 124 can enable the fault-tolerant machine learning agent 102 to guide the control system 106 out of a set of circumstances that may lead to an operational failure. As will be elaborated upon below, the redundancy agent 118 can be a multidimensional lookup table that is generated by a plurality of machine learning agents to enable coverage of various failure condition 126.

The nominal action 120 and the backup action 124 can subsequently be provided to the selector agent 114. As mentioned above, the selector agent 114 can analyze the state data 110 to determine the presence of any failure conditions 126 at the components 108 by calculating various error metrics 128. In various examples, the error metrics 128 can relate to individual states or components 108 of the environment 104. For instance, one error metric 128 can capture a temperature difference between a datacenter aisle and the outside air. The error metrics 128 can be compared against various threshold error metrics 130 defined by the failure conditions 126 to determine if an operational failure is likely. If the error metrics 128 do not meet or exceed the threshold error metrics 130, the environment 104 can be considered to be functioning normally. Accordingly, the selector agent 114 can select the nominal action 120 for execution by the control system 106 to maintain or improve performance of the components 108.

Conversely, in the event one or more error metrics 128 meet or exceed the threshold error metrics 130 to trigger a failure condition 126, the selector agent 114 can select the backup action 124 generated by the redundancy agent 118 to address the failure conditions 126. For example, in a datacenter cooling system, the state data 110 may indicate that the temperature difference between a hot aisle temperature and a cold aisle temperature has reached or fallen below a threshold temperature difference. This can lead to overheating in the datacenter racks as the supply of cool air is exhausted. In response, the selector agent 114 can choose to deploy the backup actions 124 generated by the redundancy agent 118 to address the specific circumstances causing the failure condition 126. In this example, the backup action 124 can define temperature setpoints for air exchange units to return the temperature difference to normal ranges and prevent overheating. As will be discussed below, the backup actions 124 can be selected by the redundancy agent 118 for different condition ranges as well as operational needs thereby introducing the multidimensionality of the lookup table for the redundancy agent 118.

As mentioned above, the fault-tolerant machine learning agent 102 can be configured to evaluate the success of the selected action 132 within the environment 104 to adjust and optimize subsequent selected actions 132. For example, the fault-tolerant machine learning agent 102 can extract updated state data 110 following execution of the selected action 132. The new iteration of the state data 110 can capture changes that have occurred as a result of the selected action 132. From an analysis of the updated state data 110, the fault-tolerant machine learning agent 102 can quantify the success of the selected action 132. For instance, the nominal agent 116 can be configured to calculate an overall error rate for the environment 104 from the state data using the error states 122 as discussed above. In this way, the fault-tolerant machine learning agent can iteratively uncover methods for minimizing operational errors thereby increasing the resilience of the overall system 100.

In addition, the updated state data 110 can be utilized to update the redundancy agent 118. As will be discussed below, the redundancy agent 118 can include a lookup table that stores a plurality of predefined actions that can be applied to the control system 106. In various examples, the lookup table can be constructed from the output of a plurality of machine learning agents trained on historical state and action data. As such, the lookup table can be periodically updated using new state data 110 to augment the historical datasets that were initially used to construct the lookup tables for the redundancy agent 118. In this way, as operating conditions 112 change within the environment 104, the redundancy agent 118 can maintain effective backup actions 118 to address potential failures.

Figure 2:
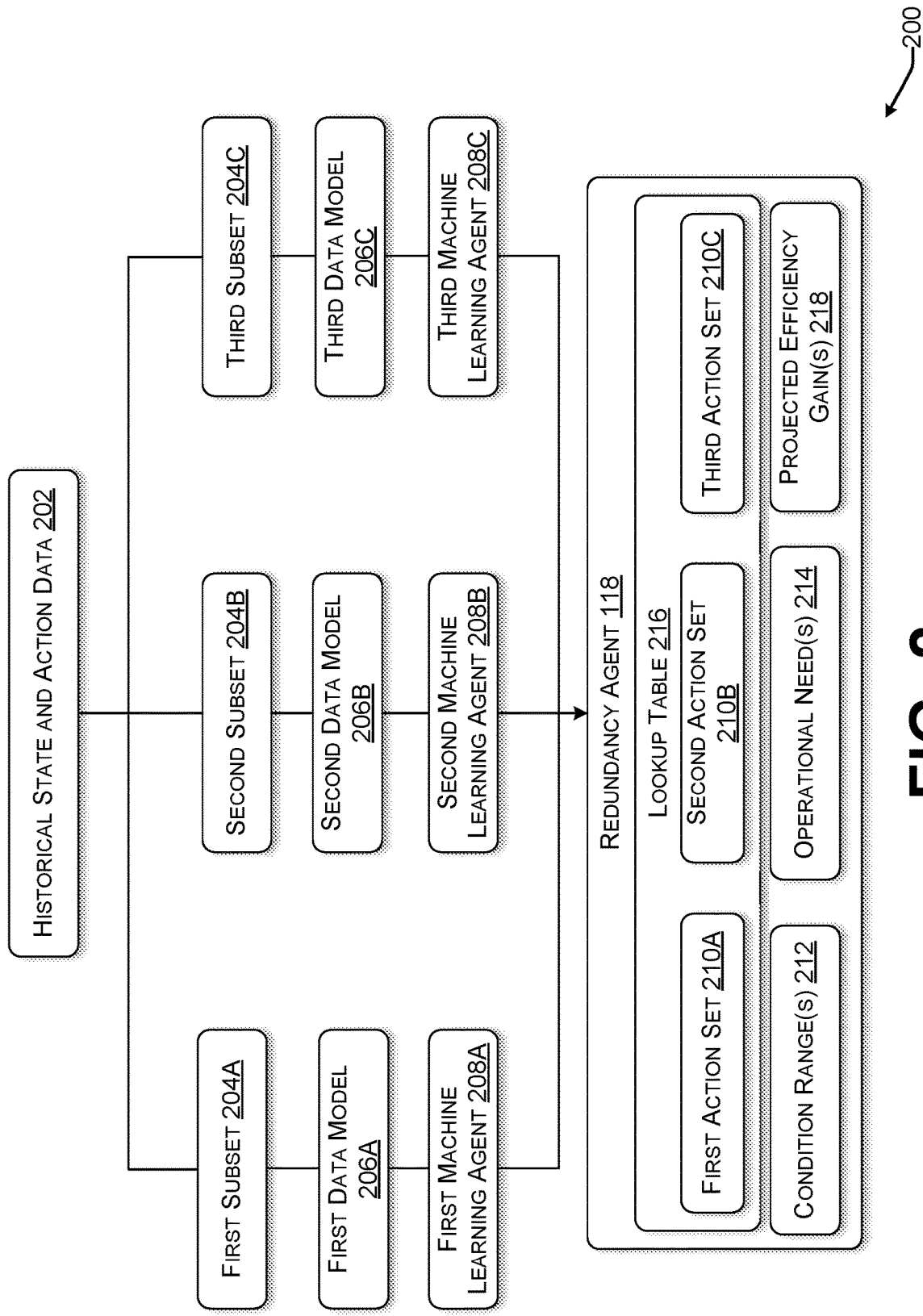
FIG. 2 is a block diagram illustrating a process for constructing a redundancy agent for the fault-tolerant machine learning agent.

Turning now to FIG. 2, details on the construction of the redundancy agent 118 are shown and described. In many examples, the redundancy agent 118 can be constructed using historical state and action data 202 collected from the environment 104. For example, the environment 104 can be a climate control system. Accordingly, the historical state and action data 202 can include records of chiller setpoint temperatures, external air temperatures, active hours, and so forth. The historical state and action data 202 can be collected for a specific timeframe (e.g., the last six months) and can be broad or specific in nature. For instance, the historical state and action data 202 can include data for the specific climate control system that the redundancy agent 118 will operate in. Alternatively, the historical state and action data 202 can include data collected from many climate control systems in the local area to uncover large-scale trends in temperature management as subject to local weather and other factors.

Subsequently, the historical state and action data 202 can be divided into subsets 204A-204C according to applicable condition ranges that impact system operations. For example, the historical state and action data 202 for a climate control system can be divided into subsets 204 according to external air temperature as external air temperature tends to directly influence climate control systems. In addition, the historical state and action data 202 can be divided according to operational needs of the components 108. In one example, the historical state and action data 202 can be collected from a cooling system for a datacenter. Within the datacenter, different physical locations can have different cooling needs as subject to air flow, configuration of computing hardware (e.g., CPUs, GPUs), operational loads (e.g., compute intensive vs memory intensive), and so forth.

As shown in FIG. 2, the historical state and action data 202 can be divided into a plurality of subsets 204A-204C according to various criteria as discussed above. While FIG. 2 illustrates three subsets 204, it should be understood that the historical state and action data 202 can be divided into any number of subsets 204 as is suitable. A data model 206A-206C can be generated from each subset 204 that organizes the data within the subset 204 to be suitable for building and training machine learning agents 208A-208C. In some examples, the machine learning agents 208 can be reinforcement learning models and may undergo many training iterations using the data models 206. In this way, each machine learning model 208 can determine a realistically optimal action set 210 for a specified condition range 212, set of operational needs 214, and the like. For instance, the machine learning agents 208 can be trained to manage emergency cooling for a specific external air temperature and equipment configuration. In addition, the machine learning agents 208 can incorporate aging and drift awareness in their respective evaluation models to enable action sets 210 that can be reliably applied as the components 108 age or otherwise drift in functionality over time.

The action sets 210 determined by the machine learning agents 208 can subsequently be collected as a lookup table 216 to form the main component of the redundancy agent 118. As mentioned above, the redundancy agent 118 can be a multidimensional lookup table 216 that is indexed using the same criteria that were utilized to divide the historical state and action data 202 into the subsets 204. In a specific example, the historical state and action data 202 for a cooling system can be divided according to external air temperature and hardware configuration (e.g., CPU and GPU). At a later point, in the event of a failure condition 126, the redundancy agent 118 can provide a backup action 124 that resolves the failure condition 126 for a specific external air temperature and hardware configuration.

Furthermore, the redundancy agent 118 can additionally be constructed with margins that prevent the redundancy agent 118 from inadvertently causing additional failure conditions 126. For example, the selector agent 114 may turn to the redundancy agent 118 to resolve a temperature difference issue for a hot aisle and a cold aisle in a datacenter by adjusting temperature setpoints. Without the safeguards provided by margining the lookup table 216 of the redundancy agent 118, the redundancy agent 118 may resolve the temperature difference issue while also creating a new issue elsewhere in the datacenter. By restricting the range of backup actions 124 that the redundancy agent 118 can generate, the disclosed system can safely resolve failure conditions 126 without causing an additional failure condition 126.

As mentioned above, the redundancy agent 118 can include the criteria used to divide the initial historical state and action data 202 into the various subsets 204. In the example of FIG. 2, the redundancy agent 118 can include the condition ranges and the operational needs 212 that were used to divide the historical state and action data 202. At a later point, when the redundancy agent 118 can be utilized to resolve a failure condition 126, the system can provide the relevant condition ranges 212 and operational needs 214 to the redundancy agent 118. Accordingly, an action can be selected from the lookup table 216 and applied to the control system 106 to resolve the failure condition 126. In addition, the redundancy agent 118 can include projected efficiency gains 218 for associated action sets within the lookup table 216. By determining locally optimal action sets 210 using the plurality of machine learning agents 206 as shown in FIG. 2, the disclosed system can discover incremental efficiency improvements that can collectively enhance the performance of the environment 104 as a whole.

Figure 3A:
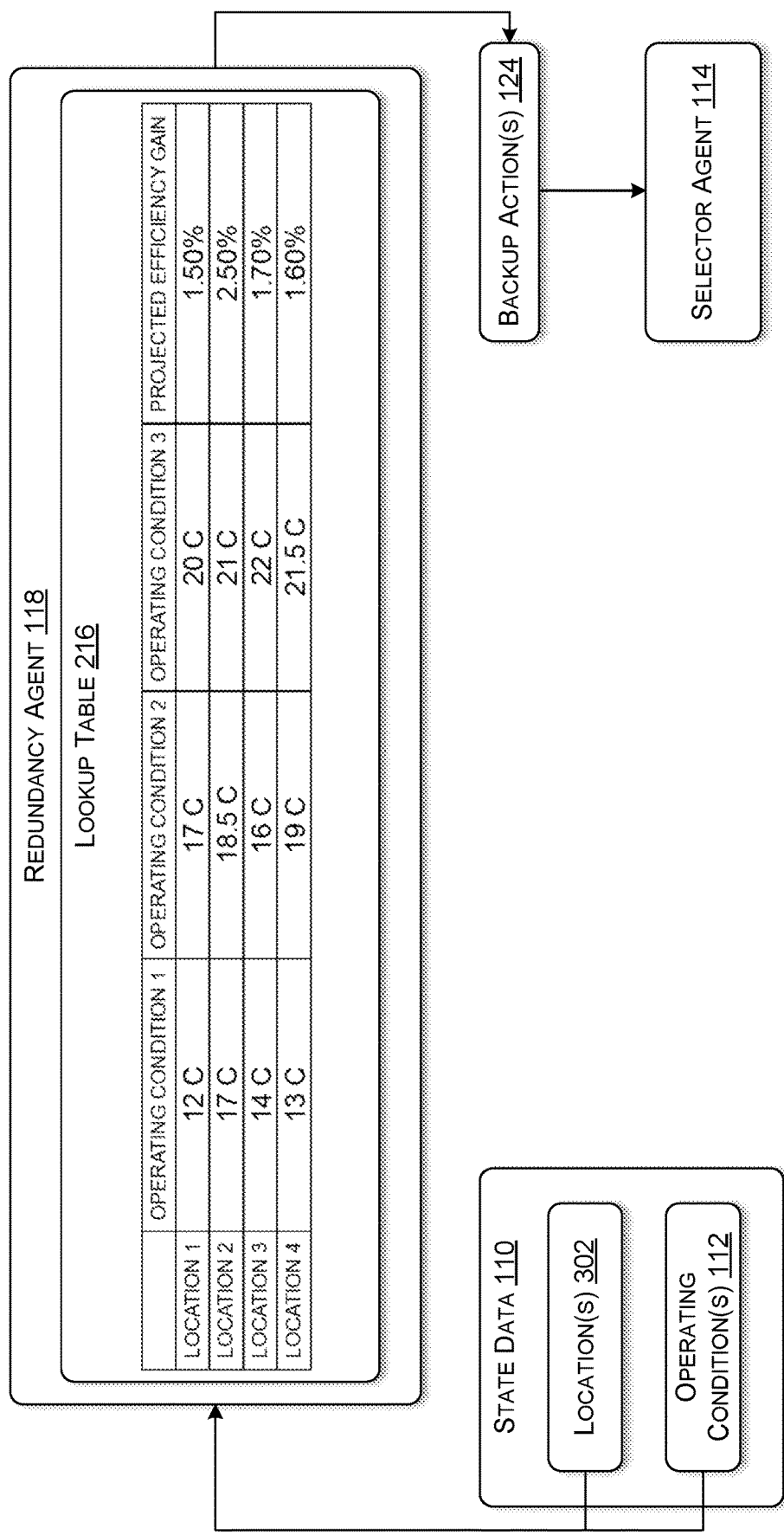
FIG. 3A is a block diagram illustrating the process of selecting a backup action using the redundancy agent.

Turning now to FIG. 3A, details of the operation of the redundancy agent 118 are shown and described. As shown in FIG. 3, the redundancy agent 118 can comprise a lookup table 216 that contains the action sets 210 generated by machine learning agents 208 trained on historical state and action data 202. In the example of FIG. 3, the redundancy agent 118 can be deployed as part of a fault-tolerant machine learning agent 102 for managing a cooling system in a datacenter environment 104. As discussed above, the lookup table 216 can be indexed by various factors to enable specificity when selecting a backup action 124. In the context of a datacenter cooling system, the lookup table 216 may define a plurality of setpoints for chiller units. Accordingly, the lookup table 216 can be indexed using a location 302 and operating conditions 112 of the datacenter environment 104. In various examples, the location 302 can define a specific location within the datacenter such as a particular server rack or set of racks. Since different locations 302 within the datacenter may be served by different cooling infrastructure as well as have different hardware configurations, the cooling needs of each location can vary.

Similarly, cooling needs can vary subject to various operating conditions 112 of the datacenter. For instance, the lookup table 216 can be indexed by outside air temperature as the operating condition 112. In an illustrative example, the location 302 specifies location 4 while the operating condition 112 specifies operating condition 1. Accordingly, the backup action 124 defines a setpoint of 13 degrees Celsius for the chiller. The backup action 124 is then provided to the selector agent 114. As described above, the selector agent 114 can then select the backup action 124 in the event of a failure condition 126 at the datacenter.

Figure 3B:
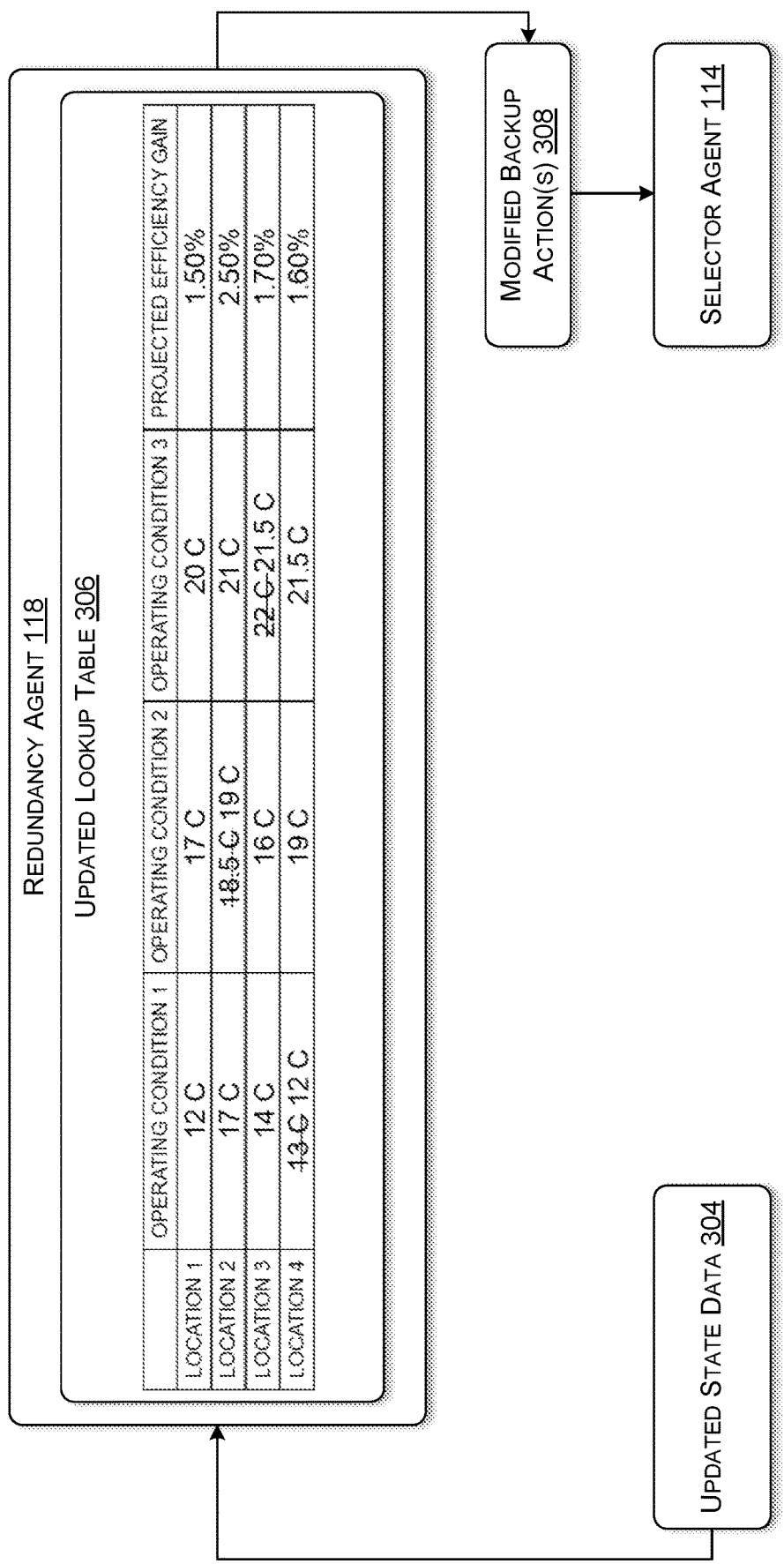
FIG. 3B is a block diagram illustrating an update to the lookup table of the redundancy agent.

Proceeding to FIG. 3B, the lookup table 216 can also be updated over time as mentioned above. For instance, the fault-tolerant machine learning agent 102 may extract updated state data 304 from the environment 104 after applying the selected action 132. The updated state data 304 may be utilized to augment the historical state and action data 202 used to train the machine learning agents 208 as discussed above with respect to FIG. 2. From analysis of the updated state data 304 the machine learning agents 208 may modify some of the predetermined actions in the lookup table 216. Consequently, the updated lookup table 306 can define new backup actions 124 that suit the changing operating conditions 112 of the datacenter environment 104. As such, the redundancy agent 118 can provide modified backup actions 308 to the selector agent 114. In this way, the redundancy agent 118 can iteratively update itself to ensure realistically optimal resolution of failure conditions 126. For example, the modified backup action 308 for location 4 and operating condition 1 now defines a setpoint of 12 degrees Celsius.

Figure 4:
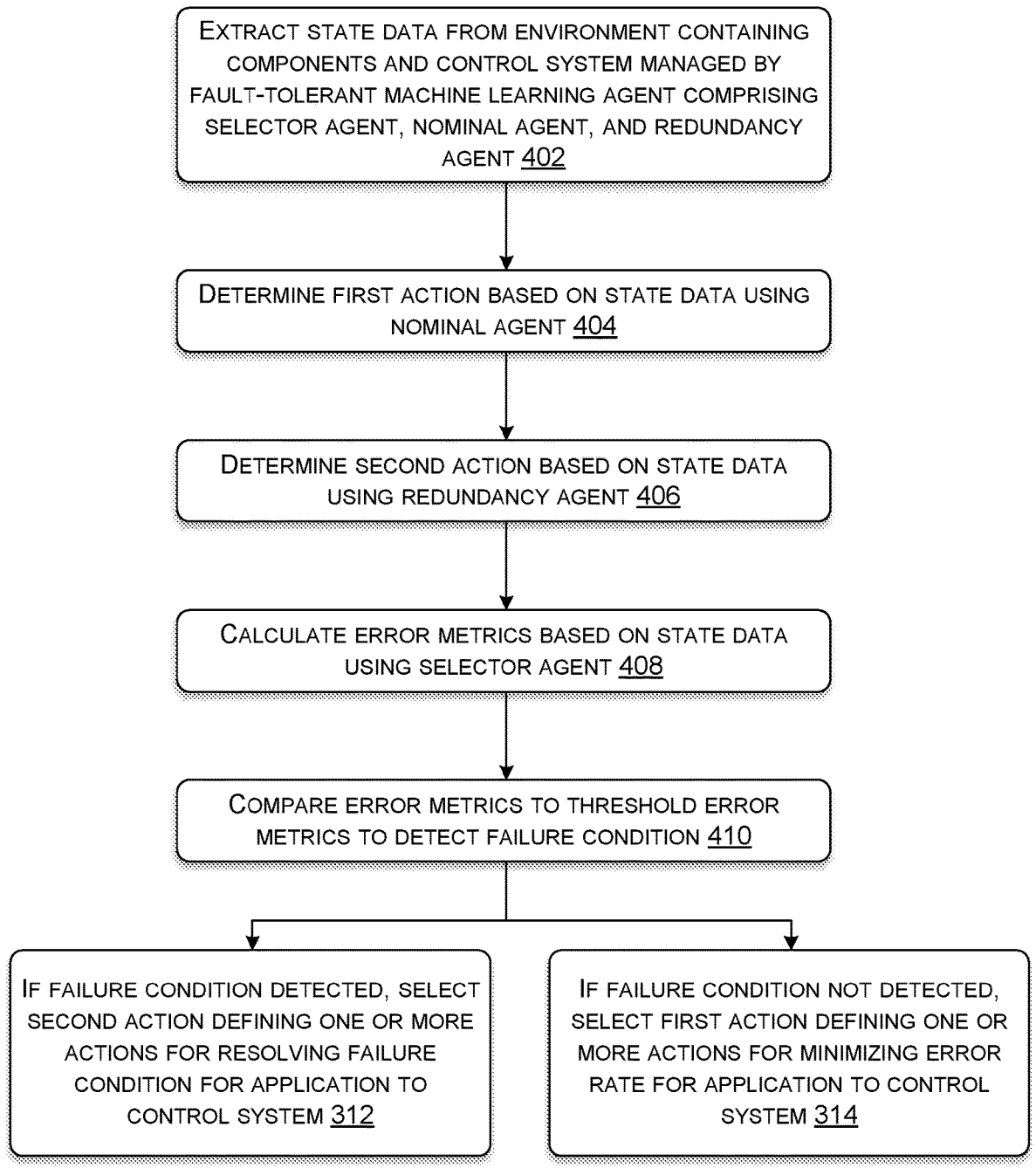
FIG. 4 is a flow diagram showing aspects of a routine for utilizing a fault-tolerant machine learning agent to manage a control system.

Turning now to FIG. 4, aspects of a routine 400 for enabling quality awareness in machine learning models for autonomous platforms are shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 4, the process 400 begins at operation 402 where a fault-tolerant machine learning agent extracts state data from an environment containing a control system and various components operated by the control system. As mentioned above, the fault-tolerant machine learning agent can comprise a selector agent, a nominal agent, and a redundancy agent.

Next, at operation 404, the nominal agent generates a first action based on the state data. In various examples, the nominal agent can define error states that correspond to states extracted form the state data. Furthermore, the nominal agent can be configured to iteratively minimize operational errors of the control system via the nominal actions it generates.

Then, at operation 406, the redundancy agent generates a second action based on the state data. In contrast to the nominal agent which can be a machine learning agent such as a reinforcement learning model, the redundancy agent can be a multidimensional lookup table that contains many possible actions. An action can be selected from the lookup table according to various criteria the best suite the various failure conditions.

Subsequently, at operation 408, the selector agent calculates a plurality of error metrics based on the state data. The error metrics can be calculated from an analysis of the various measurements captured by the state data. In one example, an error metric can be a temperature difference between a hot aisle and a cold aisle of a cooling system for a datacenter.

Then, at operation 410, the selector agent compares the error metrics against corresponding threshold error metrics. As mentioned above, these thresholds can be defined in failure conditions provided to the selector agent. In addition, the threshold error metrics can be user defined (e.g., by a system engineer).

If a failure condition is detected, the routine 400 proceeds to operation 412 where the selector agent selects the second action generated by the redundancy agent for application to the control system. The second action can define one or more operations for resolving the failure condition and restore normal operations. For instance, the second action can adjust setpoints for air handling units to restore nominal temperatures in a datacenter.

Alternatively, if a failure condition is not detected, the routine 400 proceeds to operation 314 where the selector agent selects the first action generated by the nominal agent. In contrast to the second action, the first action can define one or more operations to minimize operational errors (e.g., an error rate) of the control system. As mentioned above, this addresses a common technical challenge of machine learning systems as machine learning agents tend to accumulate errors over long periods of operation.

Figure 5:
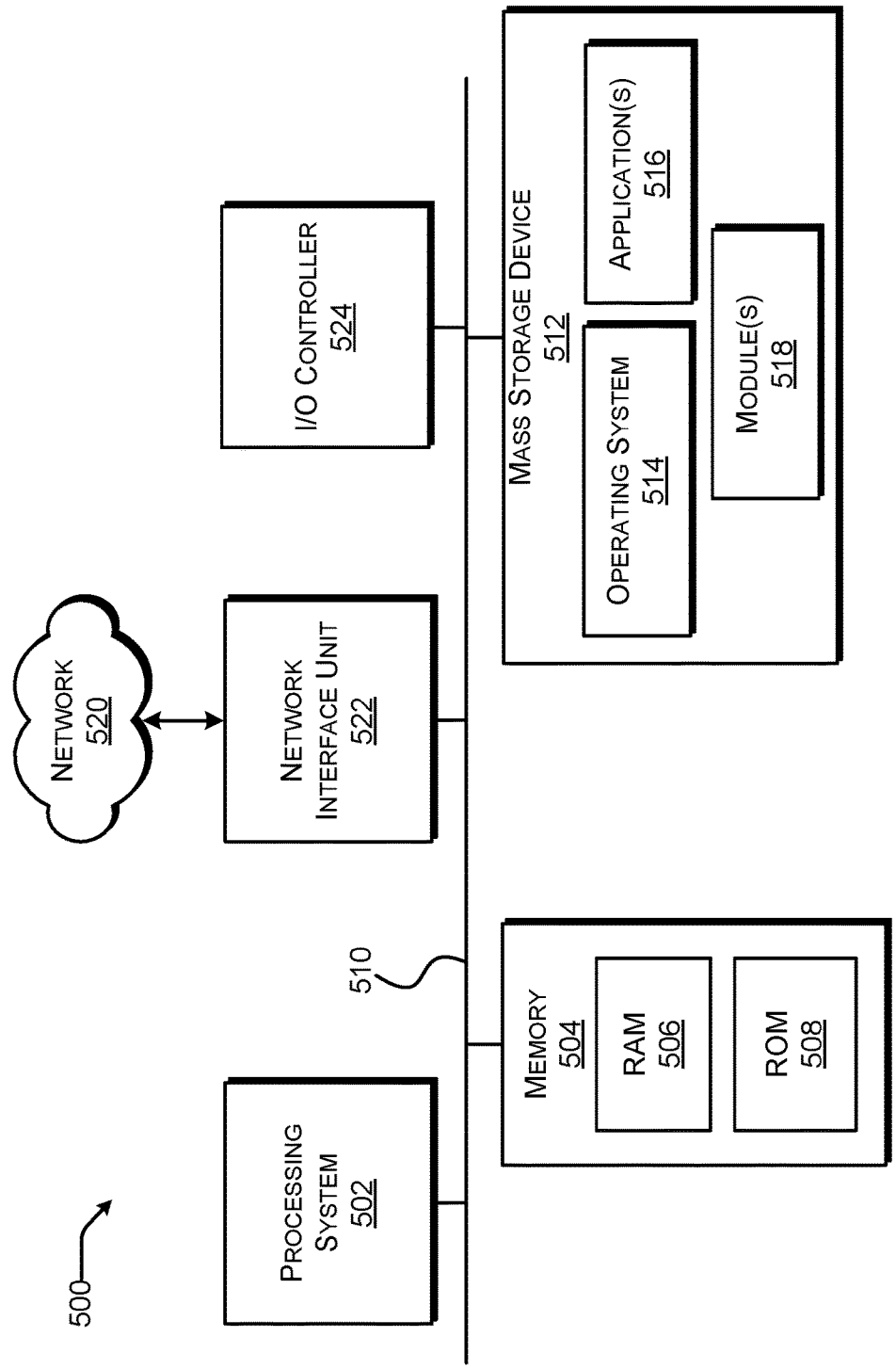
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a device, such as a computer or a server configured as part of the cloud-based platform or system 100, capable of executing computer instructions (e.g., a module or a program component described herein). The computer architecture 500 illustrated in FIG. 5 includes processing unit(s) 502, a system memory 504, including a random-access memory 506 ("RAM") and a read-only memory ("ROM") 508, and a system bus 510 that couples the memory 504 to the processing unit(s) 502.

Processing unit(s), such as processing unit(s) 502, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518, and other data described herein.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage media or communication media that can be accessed by the computer architecture 500.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510. The computer architecture 500 also may include an input/output controller 524 for receiving and processing input from a number of other devices, including a keyboard, mouse, touch, or electronic stylus or pen. Similarly, the input/output controller 524 may provide output to a display screen, a printer, or other type of output device.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transition between states, thereby transforming the transistors or other discrete hardware elements constituting the processing unit(s) 502.

Figure 6:
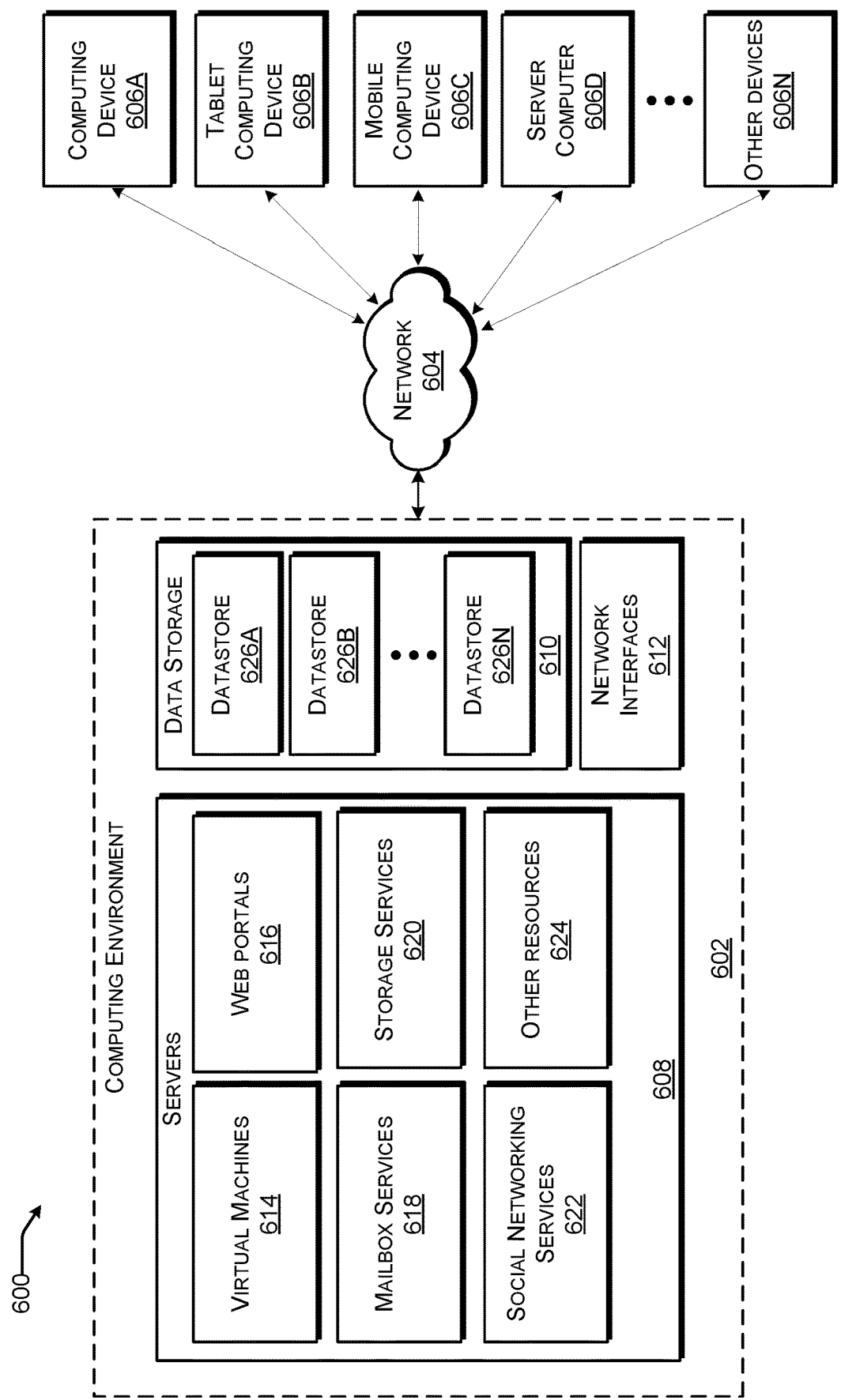
FIG. 6 is a diagram illustrating a distributed computing environment capable of implementing aspects of the techniques and technologies presented herein.

FIG. 6 depicts an illustrative distributed computing environment 600 capable of executing the software components described herein. Thus, the distributed computing environment 600 illustrated in FIG. 6 can be utilized to execute any aspects of the software components presented herein. For example, the distributed computing environment 600 can be utilized to execute aspects of the software components described herein.

Accordingly, the distributed computing environment 600 can include a computing environment 602 operating on, in communication with, or as part of the network 604. The network 604 can include various access networks. One or more client devices 606A-606N (hereinafter referred to collectively and/or generically as "clients 606" and also referred to herein as computing devices 606) can communicate with the computing environment 602 via the network 604. In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602.

In various examples, the computing environment 602 includes servers 608, data storage 610, and one or more network interfaces 612. The servers 608 can host various services, virtual machines, portals, and/or other resources. In the illustrated configuration, the servers 608 host virtual machines 614, Web portals 616, mailbox services 618, storage services 620, and/or, social networking services 622. As shown in FIG. 6 the servers 608 also can host other services, applications, portals, and/or other resources ("other resources") 624.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more servers configured to host data for the computing environment 600. The data storage 610 can include, host, or provide one or more real or virtual datastores 626A-626N (hereinafter referred to collectively and/or generically as "datastores 626"). The datastores 626 are configured to host data used or created by the servers 808 and/or other data. That is, the datastores 626 also can host or store web page documents, word documents, presentation documents, data structures, algorithms for execution by a recommendation engine, and/or other data utilized by any application program. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the computing devices and the servers. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing the techniques disclosed herein, among other aspects.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
   extracting, by one or more processing units, data defining a current state of an environment containing a plurality of components and a control system that is managed by a fault tolerant machine learning agent comprising a selector agent, a nominal agent, and a redundancy agent;
   generating, by the nominal agent, a first action based on the data defining the current state of the environment, wherein the first action:
   is generated irrespective of a failure condition of the plurality of components; and
   presumes a normal function of the plurality of components;
   generating, by the redundancy agent, a second action based on the data defining the current state of the environment, wherein the second action:
   is generated irrespective of the failure condition of the plurality of components;
   presumes a malfunction of the plurality of components; and
   defines an operation for resolving the malfunction;
   calculating, by the selector agent, a plurality of error metrics based on the data defining the current state of the environment;
   determining, by the selector agent, whether one or more of the plurality of error metrics meets or exceeds a threshold error metric indicating the failure condition of the plurality of components; and
   selecting, by the selector agent, the first action generated by the nominal agent for application to the control system or the second action generated by the redundancy agent for application to the control system based on whether the one or more of the plurality of error metrics meets or exceeds the threshold error metric.

2. The method of claim 1, wherein the redundancy agent is a two-dimensional lookup table.

3. The method of claim 1, wherein the redundancy agent is constructed based on historical state and action data extracted from the control system.

4. The method of claim 1, wherein:
the redundancy agent includes a plurality of predetermined actions; and
generating the second action comprises selecting the second action from the plurality of predetermined actions.

5. The method of claim 1, wherein the second action is generated based on an operating condition of the plurality of components.

6. The method of claim 1, further comprising constructing the redundancy agent by:
dividing a historical state and action dataset into a plurality of subsets to construct a corresponding plurality of data models;
providing each data model of the plurality of data models to a corresponding machine learning agent to generate a plurality of suggested actions; and
constructing a lookup table comprising the plurality of suggested actions.

7. The method of claim 1, wherein generating the second action comprises:
providing one or more operating conditions to the redundancy agent; and
indexing a lookup table of the redundancy agent comprising a plurality of predetermined actions with the one or more operating conditions to select the second action from the plurality of predetermined actions.

8. A system comprising:
one or more processing units; and
a computer-readable medium having encoded thereon, computer-readable instructions that when executed by the one or more processing units, cause the system to:
extract, data defining a current state of an environment containing a plurality of components and a control system that is managed by a fault tolerant machine learning agent comprising a selector agent, a nominal agent, and a redundancy agent;
generate, by the nominal agent, a first action based on the data defining the current state of the environment, wherein the first action:
is generated irrespective of a failure condition of the plurality of components; and
presumes a normal function of the plurality of components;
generate, by the redundancy agent, a second action based on the data defining the current state of the environment, wherein the second action:
is generated irrespective of the failure condition of the plurality of components;
presumes a malfunction of the plurality of components; and
defines an operation for resolving the malfunction;
calculate, by the selector agent, a plurality of error metrics based on the data defining the current state of the environment;
determine, by the selector agent, whether one or more of the plurality of error metrics meets or exceeds a threshold error metric indicating the failure condition of the plurality of components; and select, by the selector agent, the first action generated by the nominal agent for application to the control system or the second action generated by the redundancy agent for application to the control system based on whether the one or more of the plurality of error metrics meets or exceeds the threshold error metric.

9. The system of claim 8, wherein the redundancy agent is a two-dimensional lookup table.

10. The system of claim 8, wherein the redundancy agent is constructed based on historical state and action data extracted from the control system.

11. The system of claim 8, wherein:
the redundancy agent includes a plurality of predetermined actions; and
generating the second action comprises selecting the second action from the plurality of predetermined actions.

12. The system of claim 8, wherein the second action is generated based on an operating condition of the plurality of components.

13. The system of claim 8, wherein the computer-readable instructions further cause the system to construct the redundancy agent by:
dividing a historical state and action dataset into a plurality of subsets to construct a corresponding plurality of data models;
providing each data model of the plurality of data models to a corresponding machine learning agent to generate a plurality of suggested actions; and
constructing a lookup table comprising the plurality of suggested actions.

14. The system of claim 8, wherein generating the second action comprises:
providing one or more operating conditions to the redundancy agent; and
indexing a lookup table of the redundancy agent comprising a plurality of predetermined actions with the one or more operating conditions to select the second action from the plurality of predetermined actions.

15. A computer-readable storage medium having encoded thereon computer-readable instructions that when executed by one or more processing units cause a system to:
extract, data defining a current state of an environment containing a plurality of components and a control system that is managed by a fault tolerant machine learning agent comprising a selector agent, a nominal agent, and a redundancy agent;
generate, by the nominal agent, a first action based on the data defining the current state of the environment, wherein the first action:
is generated irrespective of a failure condition of the plurality of components; and
presumes a normal function of the plurality of components;
generate, by the redundancy agent, a second action based on the data defining the current state of the environment, wherein the second action:
is generated irrespective of the failure condition of the plurality of components;
presumes a malfunction of the plurality of components; and
defines an operation for resolving the malfunction;
calculate, by the selector agent, a plurality of error metrics based on the data defining the current state of the environment;

determine, by the selector agent, whether one or more of the plurality of error metrics meets or exceeds a threshold error metric indicating the failure condition of the plurality of components; and select, by the selector agent, the first action generated by the nominal agent for application to the control system or the second action generated by the redundancy agent for application to the control system based on whether the one or more of the plurality of error metrics meets or exceeds the threshold error metric.

16. The computer-readable storage medium of claim 15, wherein the redundancy agent is a two-dimensional lookup table.

17. The computer-readable storage medium of claim 15, wherein the redundancy agent is constructed based on historical state and action data extracted from the control system.

18. The computer-readable storage medium of claim 15, wherein:

the redundancy agent includes a plurality of predetermined actions; and generating the second action comprises selecting the second action from the plurality of predetermined actions.

19. The computer-readable storage medium of claim 15, wherein the second action is generated based on an operating condition of the plurality of components.

20. The computer-readable storage medium of claim 15, wherein the computer-readable instructions further cause the system to construct the redundancy agent by:

dividing a historical state and action dataset into a plurality of subsets to construct a corresponding plurality of data models;

providing each data model of the plurality of data models to a corresponding machine learning agent to generate a plurality of suggested actions; and constructing a lookup table comprising the plurality of suggested actions.

* * * * *